(12) United States Patent
Laricchia et al.

(10) Patent No.: US 7,326,333 B2
(45) Date of Patent: Feb. 5, 2008

(54) APPARATUS AND PROCESS FOR EXTRACTING SULFUR COMPOUNDS FROM A HYDROCARBON STREAM

(75) Inventors: Luigi Laricchia, Arlington Heights, IL (US); Jonathan A. Tertel, Mount Prospect, IL (US); Allen W. Thomas, Chicago, IL (US)

(73) Assignee: UOP LLC, Des Plaines, IL (US)

( * ) Notice: Subject to any disclaimer, the term of this patent is extended or adjusted under 35 U.S.C. 154(b) by 1101 days.

(21) Appl. No.: 10/027,153

(22) Filed: Dec. 20, 2001

(65) Prior Publication Data

US 2004/0175307 A1 Sep. 9, 2004

(51) Int. Cl.
*C10G 19/00* (2006.01)
*B01J 8/04* (2006.01)

(52) U.S. Cl. .................. 208/226; 208/227; 208/228; 422/190; 422/191; 422/193

(58) Field of Classification Search ........... 208/208 R, 208/227, 234, 228, 206 R; 422/189, 190, 422/191, 193
See application file for complete search history.

(56) References Cited

U.S. PATENT DOCUMENTS

| | | | | |
|---|---|---|---|---|
| 2,228,028 A * | 1/1941 | Brower | ............... | 208/227 |
| 2,337,467 A * | 12/1943 | Hewlett | ............... | 208/227 |
| 2,431,770 A | 12/1947 | Payne et al. | ............... | 196/32 |
| 2,986,514 A * | 5/1961 | Mitchell et al. | ............... | 208/284 |
| 3,708,421 A | 1/1973 | Rippie | ............... | 208/244 R |
| 3,980,582 A * | 9/1976 | Anderson et al. | ............... | 502/163 |
| 4,049,572 A | 9/1977 | Douglas | ............... | 252/431 N |
| 4,344,840 A * | 8/1982 | Kunesh | ............... | 208/59 |
| 4,404,098 A * | 9/1983 | Asdigian | ............... | 208/235 |
| 4,562,300 A | 12/1985 | LaFoy | ............... | 585/854 |
| 4,983,471 A * | 1/1991 | Reichner et al. | ............... | 429/19 |
| 5,244,643 A | 9/1993 | Verachtert | ............... | 423/243.08 |
| 5,456,889 A * | 10/1995 | Pow et al. | ............... | 422/173 |
| 6,132,590 A * | 10/2000 | Moran et al. | ............... | 205/496 |
| 6,224,750 B1* | 5/2001 | Pittman et al. | ............... | 208/226 |
| 6,306,288 B1* | 10/2001 | Pittman et al. | ............... | 208/235 |
| 6,402,940 B1* | 6/2002 | Rappas | ............... | 208/240 |
| 6,406,616 B1* | 6/2002 | Rappas et al. | ............... | 208/240 |
| 6,551,502 B1* | 4/2003 | Lee et al. | ............... | 208/211 |
| 6,673,236 B2* | 1/2004 | Stanciulescu et al. | ... | 208/208 R |
| 6,702,935 B2* | 3/2004 | Cash et al. | ............... | 208/58 |
| 6,749,741 B1* | 6/2004 | Laricchia et al. | ............... | 208/226 |
| 6,824,750 B2* | 11/2004 | Bravo | ............... | 422/256 |
| 7,005,058 B1* | 2/2006 | Towler | ............... | 208/211 |
| 2001/0015136 A1* | 8/2001 | Letzel | ............... | 96/356 |

OTHER PUBLICATIONS

J.R. Salazar, *Handbook of Petroleum Refining Processes*, 9-4 to 9-5 (Robert A. Mey rs ed. 1986).

\* cited by examiner

*Primary Examiner*—N. Bhat
(74) *Attorney, Agent, or Firm*—James C. Paschall

(57) ABSTRACT

Described is an apparatus and process for extracting sulfur compounds from a hydrocarbon stream. A prewash section for converting hydrogen sulfide to sodium sulfide by reaction with an alkali such as caustic communicates with an extractor section disposed directly above the prewash section for converting mercaptans to mercaptides by reaction with alkali. Hydrocarbon product exits the extractor section through a coalescer that prevents alkali from exiting with the hydrocarbon product stream.

19 Claims, 3 Drawing Sheets

APPARATUS AND PROCESS FOR EXTRACTING SULFUR COMPOUNDS FROM A HYDROCARBON STREAM

BACKGROUND OF THE INVENTION

This invention relates generally to a process and apparatus for the removal of organic sulfur compounds from a stream containing hydrocarbons. In particular, it relates to the use of an aqueous caustic solution to remove mercaptans from a hydrocarbon stream.

DESCRIPTION OF THE PRIOR ART

It is conventional practice at the present time to treat sour hydrocarbon and gas streams to remove mercaptans. Extraction processes are typically used when treating light hydrocarbons and gas streams for mercaptan removal. Mercaptans have traditionally been removed from hydrocarbon streams because of their malodorous scent.

U.S. Pat. No. 5,244,643 B1 discloses a process whereby a hydrocarbonaceous gas stream including mercaptan sulfur, air and aqueous alkaline solution including a mercaptan oxidation catalyst are mixed in a mixing vessel in which mercaptans are converted to disulfides. The effluent withdrawn from the top of the mixing vessel is settled in a vessel to yield separated streams of air, liquid hydrocarbon product containing disulfide and an aqueous alkaline solution including mercaptan oxidation catalyst.

U.S. Pat. No. 4,562,300 B1 discloses contacting a hydrocarbon stream including organic mercaptans with sodium hydroxide to free the hydrocarbons from the organic mercaptans. The caustic solution rich in mercaptans is oxidized with a catalyst and the organic mercaptans are converted to organic disulfides. The mixture of regenerated caustic solution free of organic mercaptans and organic disulfides enter a settler in which the organic disulfides and caustic solution are separated. A stream of hydrocarbon from which the mercaptans had been extracted upstream are admixed with regenerated aqueous caustic solution containing small amounts of organic disulfides to extract the organic disulfides from the regenerated caustic solution. These processes leave disulfides in the liquid hydrocarbon stream. Anticipated and current governmental regulations are increasing the undesirability of leaving organic disulfides in a liquid hydrocarbon product stream.

In a liquid-liquid extraction process, disulfides are removed from the hydrocarbon stream not to be returned. A liquid-liquid extraction process is generally described in J. R. Salazar, *Handbook of Petroleum Refining Processes* 9-4-9-5 (Robert A. Meyers ed. 1986). In a typical extraction process, a liquid hydrocarbon stream is fed to an amine absorber column to be contacted with an amine, such as diethylamine, to absorb acid gases such as hydrogen sulfide and carbon dioxide from the hydrocarbon stream. The hydrocarbon stream lean of hydrogen sulfide and other acid gases is prewashed in a prewash vessel containing 6.5 to 7.0 wt-% liquid caustic to convert the remaining hydrogen sulfide to sodium sulfide which is soluble in caustic. The hydrocarbon stream, now depleted of hydrogen sulfide, is subjected to counter-current flow of about 14 wt-% liquid caustic in an extractor vessel. Jet decks in the extractor vessel facilitate the counter-current contact. Mercaptans in the hydrocarbon stream react with the caustic to yield mercaptides, The mercaptides in the hydrocarbon stream are soluble in the caustic. A product hydrocarbon stream lean in mercaptans passes overhead from the extraction column through a settler drum to a sand filter vessel, and the mercaptide rich caustic passes from the bottom of the column. The settler drum allows for settling and buffers the sand filter against caustic surges. The sand filter coalesces caustic to make it gravitate to the bottom of the vessel while the product hydrocarbon stream passes out of the vessel through an outlet that is shielded at the top to prevent admittance of falling caustic droplets. The mercaptide rich caustic receives an injection of air and catalyst as it passes from the extraction column to an oxidation vessel for regeneration. Oxidizing the mercaptides to disulfides using a phthalocyanine catalyst regenerates the caustic solution. A disulfide separator receives the disulfide rich caustic from the oxidation vessel. The disulfide separator vents excess air and decants disulfides from the caustic before the regenerated caustic is drained and returned to the extractor vessel. The disulfides are run through a sand filter and removed from the process.

Hydrogen sulfide must be removed in the prewash vessel before extraction or the caustic will preferably react with the hydrogen sulfide in the extractor vessel and leave mercaptans in the hydrocarbon stream. Eventually, caustic in the prewash vessel becomes overloaded with sulfides and must be replaced to ensure adequate conversion of hydrogen sulfide. In the above-described mercaptan extraction system, the caustic in the prewash vessel had to be replaced on a batch basis. Consequently, conversion of hydrogen sulfide at the late end of the replacement cycle is lower. The prewash vessel also has to be large to assure adequate mixing of the caustic and the hydrocarbon. Moreover, the conventional mercaptan extraction system utilizes four vessels: the caustic prewash vessel, the extraction vessel, the settler drum and the sand filter vessel. Each vessel must have its own support and base structure making building this system capital-intensive.

Accordingly, it is an object of the present invention to combine the extractor vessel, the settler drum and the sand filter vessel into one vessel to thereby reduce the capital required to build an extraction system. Moreover, it is an object of the present invention to combine the caustic prewash vessel, the extractor vessel, the settler drum and the sand filter vessel into one vessel to thereby reduce the capital required to build an extraction system.

SUMMARY OF THE INVENTION

We have developed a process and apparatus for combining the functions of the extractor vessel and the sand filter vessel into one common extractor vessel. A coalescer is disposed at the top of the extractor section of the vessel to serve the function that the sand filter previously provided. The coalescer may be spaced apart from a topmost jet deck in the extractor section by sufficient volume to buffer against caustic surges to serve the function of a settler drum.

We have also developed a process and apparatus for combining the functions of the prewash vessel, the extractor vessel, the settler drum and the sand filter vessel into one common extractor vessel. An extractor section is disposed directly above a caustic prewash section.

Accordingly, in one embodiment, the present invention relates to an apparatus for converting sulfur compounds in a hydrocarbon stream. The apparatus comprises a prewash section for converting hydrogen sulfide to sodium sulfide. A hydrocarbon feed conduit has an inlet in communication with the prewash section. An extractor section for converting mercaptans to mercaptides is disposed directly above the prewash section. A hydrocarbon product conduit has an outlet in communication with the extractor section. A conduit has an outlet in communication with the prewash section and an inlet in communication with the extractor section.

In another embodiment, the present invention relates to a process for converting sulfur compounds in a hydrocarbon stream. A hydrocarbon stream containing sulfur compounds is fed to a prewash section containing alkali to convert hydrogen sulfide to sodium sulfide. A prewashed hydrocarbon stream is withdrawn from the prewash section. The prewashed hydrocarbon stream is fed to an extractor section to convert mercaptans to mercaptides. The extractor section is directly above the prewash section. An extracted hydrocarbon stream containing mercaptides is withdrawn from the extractor section In a further embodiment, the present invention relates to an apparatus for converting sulfur compounds in a hydrocarbon stream. The apparatus comprises an extractor section for converting mercaptans to mercaptides. A hydrocarbon feed conduit has an outlet in communication with the extractor section proximate a bottom of the extractor section. A hydrocarbon product conduit has an inlet in communication with the extractor section proximate a top of the extractor section. A structure for facilitating contact between alkali and hydrocarbon is disposed between the outlet of the hydrocarbon feed conduit and the inlet of the hydrocarbon product inlet. An alkaline conduit has an inlet disposed below the outlet to the hydrocarbon feed conduit. A coalescer in the extractor section is disposed between the inlet to the hydrocarbon product conduit and a top of the structure for facilitating contact between alkali and hydrocarbon. The coalescer permits no more than 1 ppm of alkali to pass therethrough.

Additional objects, embodiments and details of this invention can be obtained from the following detailed description of the invention.

DETAILED DESCRIPTION OF THE INVENTION

A general understanding of the process and apparatus of this invention can be obtained by reference to the FIGURES. The FIGURES have been simplified by the deletion of a large number of apparatuses customarily employed in a process of this nature such as vessel internals, temperature and pressure controls systems, flow control valves, recycle pumps, etc. which are not specifically required to illustrate the performance of the subject process and apparatus. Furthermore, the illustration of the process of this invention in the embodiment of a specific drawing is not intended to limit the invention or to include other embodiments set out here, or reasonably expected modifications thereof. Lastly, although aqueous caustic is mentioned as the preferred reagent for converting sulfur compounds, other aqueous alkaline solutions are contemplated.

Figure 1:
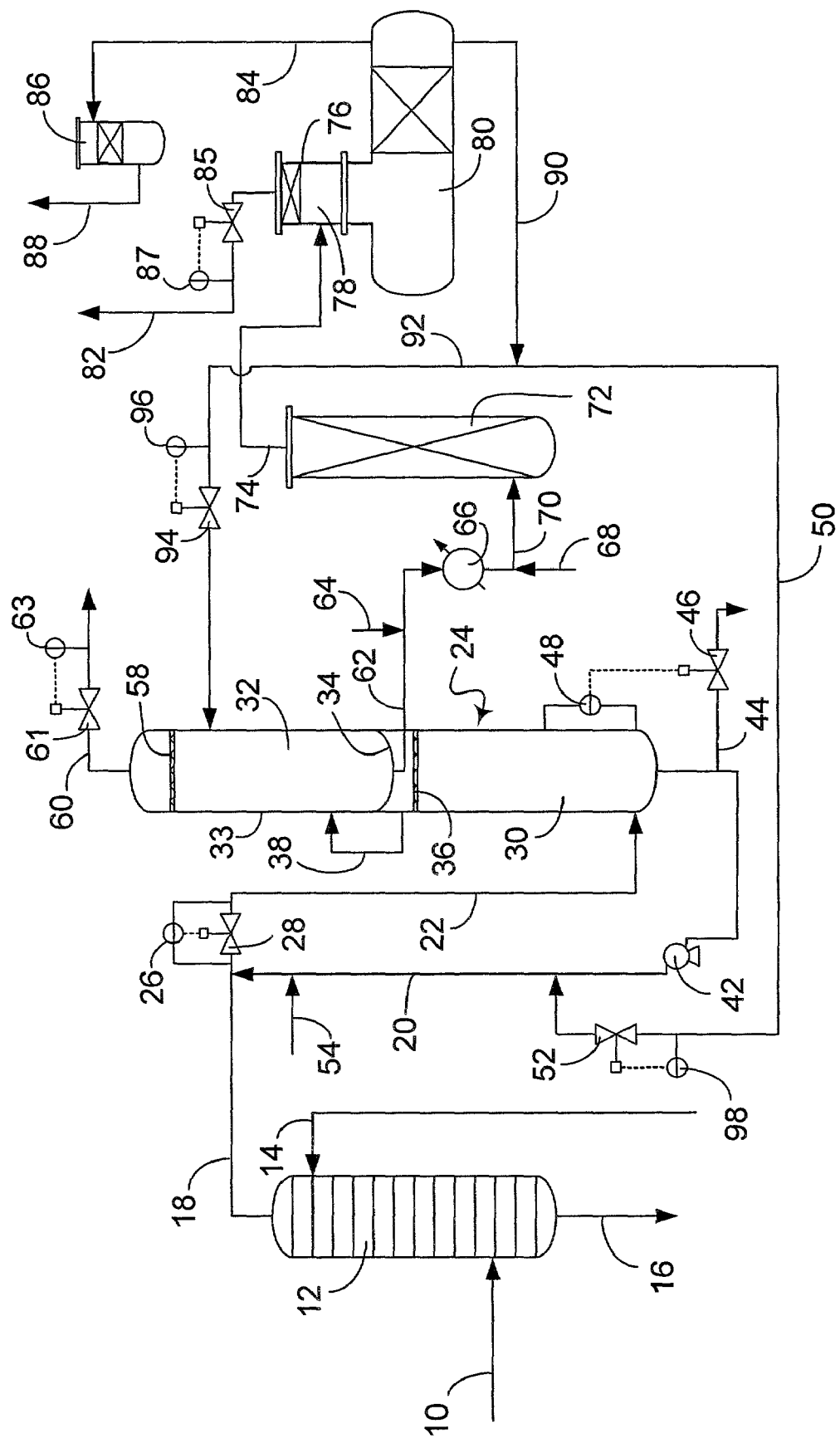
FIG. 1 is a process flow scheme for the process of the present invention.

Referring then to FIG. 1, a hydrocarbon liquid stream such as LPG or naphtha containing mercaptan sulfur and hydrogen sulfide is fed through a line 10 to an amine absorber vessel 12. Amines such as diethylamine or monoethylamine are fed to the amine absorber vessel 12 through a line 14. The amine absorber vessel 12 contains a series of trays. The line 10 delivering the hydrocarbon stream has a distributor that is below the mid-point of the vessel 12. A nozzle on the line 14 for delivering the amines is disposed toward the top of the vessel to allow counter-current contact of the amines descending in the vessel and the hydrocarbon ascending through the vessel 12. The amines in the vessel 12 react with hydrogen sulfide to yield thiolamides. Typically, a hydrocarbon stream containing approximately 1000 to 2000 wppm of hydrogen sulfide is reduced down to 15 wppm of hydrogen sulfide concentration in the amine absorber vessel 12. An amine effluent stream rich in thiolamides exits the bottom of the amine absorber vessel 12 through a line 16 while the hydrocarbon effluent stream exits the top of the amine absorber vessel 12 through a line 18 with a substantially reduced concentration of hydrogen sulfide. Additionally, carbon dioxide or other acid gases that are possibly present in the feed stream in the line 10 also react with the amines and are absorbed into the amine effluent stream leaving the amine absorber vessel 12 through the line 16.

A caustic recirculation conduit 20 joins the line 18 to allow an aqueous alkaline solution such as aqueous caustic and the hydrocarbon effluent from the amine absorber vessel 12 to mix in a line 22 before entering a extraction vessel 24. A pressure differential indicator controller (PDIC) 26 maintains a pressure drop across a control valve 28 such as 7 to 103 kPa (1 to 15 psig) and preferably 28 to 55 (4 to 8 psig) to ensure adequate mixing between the liquid caustic and the liquid hydrocarbon in the line 22.

The premixed hydrocarbon and aqueous caustic stream enter the extraction vessel 24 through the line 22. The extraction vessel 24 comprises a lower prewash section 30 and an upper extractor section 32 separated by an imperforate, downwardly convexed baffle 34. The extractor section 32 is directly above the prewash section 30 and both sections preferably share at least one common wall 33. The prewash section 30 includes a coalescer 36 proximate a top of the prewash section 30. The line 22 feeds the prewash section 30 proximate a bottom of the prewash section 30.

In the prewash section 30, an aqueous alkaline solution such as caustic of about 3 to 20 Baume (2 to 12 wt-%), suitably 5 to 17 Baume (3 to 12 wt-%) and preferably 8 to 12 Baume (5 to 8 wt-%) reacts with any remaining hydrogen sulfide to yield a sulfide salt such as sodium sulfide. Typically, the aqueous alkaline solution is about 10 Baume (7 wt-%). The higher density aqueous caustic and sulfides dissolved therein gravitate to the bottom of the prewash section 30 while the hydrocarbon depleted of hydrogen sulfide rises to the top of the prewash section 30. The coalescer 36 serves to gather together smaller droplets of caustic that rise in the prewash section 30 to give them sufficient weight to begin descending through the prewash section 30 with the rest of the caustic.

A transfer conduit 38 has an inlet in communication with the prewash section 30 proximate a top of the prewash section 30 above the coalescer 36 and an outlet in communication with the extractor section 32 proximate a bottom of the extractor section 32. The higher density caustic pushes the lower density hydrocarbon up through the transfer conduit 38 without the need for a pump. A pump 42 pumps spent caustic out of the bottom of the prewash section 30 through the recirculation conduit 20. Spent caustic is withdrawn from the recirculation conduit 20 through a line 44 regulated by a control valve 46. The flow rate of caustic through the control valve 46 is automatically controlled by a level indicator controller (LIC) 48 which monitors the level of caustic in the prewash section 30 at the hydrocarbon-caustic interface. The LIC 48 sensing the level of caustic in the prewash section 30 signals a setting for the control valve 46 relative to fully open to bring the level of the caustic in the prewash section 30 to a desired, preset level. Accordingly, spent caustic is continuously withdrawn from the prewash section 30 through the line 44 via the recirculation conduit 20. The spent caustic withdrawn through the line 44 may be sent to a spent caustic degassing drum (not shown) which allows volatile hydrocarbons to evaporate off of the top of the drum before the spent caustic descends out of the drum to treatment. Regenerated caustic in a line 50 is continuously fed to the caustic recirculation conduit 20 and hence to the prewash section 30 at a flow rate regulated by a control valve 52 governed by a flow rate controller (FRC) 98. Additionally, water is added to the caustic recirculation conduit 20 by a line 54.

An aqueous alkaline solution such as aqueous caustic in the extractor section 32 has a concentration of 17 to 25 Baume (12 to 19 wt-%), preferably 18 to 22 Baume (13 to 16 wt-%) and typically 20 Baume (14 wt-%). A hydrocarbon stream substantially devoid of hydrogen sulfide exits the outlet of the transfer conduit 38 into the extractor section 32. Mercaptans in the extractor section 32 react with the caustic to yield sodium mercaptides and water. The lower density hydrocarbons rise to the top of the extractor section 32 while the aqueous caustic and mercaptides dissolved in the aqueous caustic sink to the bottom of the extractor section 32 where it collects at the imperforate, downwardly convex baffle 34. The hydrocarbon rises to a coalescer 58 comprising a mesh blanket about 61 cm (2 feet) which coalesces smaller caustic droplets carried to the top of the extractor section 32 with hydrocarbon because of their smaller size. The coalescer 58 coalesces smaller droplets of caustic together to form larger droplets that will tend to sink back to the bottom of the extractor section 32. Treated hydrocarbon substantially devoid of mercaptans and mercaptides exits the extractor section 32 via a product conduit 60.

Spent caustic rich in mercaptides is withdrawn through a drain at the lowermost portion of the downwardly convexed baffle 34 through a line 62. The line 62 actually extends through the prewash section 30 above the coalescer 36 and through the common wall 33 thereof.

A line 64 adds oxidation catalyst to the line 62. This invention does not require the use of a specific mercaptan oxidation catalyst. Many suitable catalysts are known in the art. One preferred class of catalyst comprises sulfonated metal phthalocyanine. A particularly preferred sulfonated metal phthalocyanine is highly monosulfonated cobalt phthalocyanine prepared by the method of U.S. Pat. No. 4,049,572 B1, the teachings of which are herein incorporated by reference. Other phthalocyanine catalysts are described in U.S. Pat. No. 4,897,180 B1. Additional dipolar type catalysts that are suitable for use in an alkaline contacting solution are described in U.S. Pat. No. 4,956,324 B1; U.S. Pat. No. 3,923,645 B1; U.S. Pat. No. 3,980,582 B1 and U.S. Pat. No. 4,090,954 B1. Typically, the oxidation catalyst in the aqueous alkaline solution will have a concentration of 10 to 500 wppm and preferably a concentration of 200 wppm. The spent caustic stream with added catalyst is preferably heated in an indirect heat exchanger with low pressure stream as a heat exchange fluid in a heater 66. The heater 66 preferably heats the spent aqueous caustic from 38° C. (100° F.) to about 43° C. (110° F.). Air sufficient to oxidize the mercaptides is added to the spent caustic stream in the line 62 through a line 68 to form an oxidizer feed line 70. The spent aqueous caustic and air mixture is distributed into an oxidation vessel 72. In the oxidation vessel 72, the sodium mercaptides catalytically react with oxygen and water to yield caustic and organic disulfides. Rashig rings in the oxidation vessel 72 increase the surface area therein to improve contact with the catalyst. An exit conduit 74 withdraws effluent from a top of the oxidation vessel 72. The effluent from the oxidation vessel 72 comprises three phases including an air phase, a liquid disulfide phase and a liquid aqueous caustic phase.

The exit conduit 74 carries the effluent from the oxidation vessel 72 to a disulfide separator 76 comprising a vertical section 78 and a horizontal section 80. Once settled in the separator, the air phase exits the top of the vertical section 78 through a line 82. The two liquid phases settle in the horizontal section 80 of the disulfide separator 76. The lighter disulfide phase exits the top of the horizontal section 80 through a line 84. The disulfide effluent from the disulfide separator 76 is carried by the line 84 to a sand filter 86 to coalesce and separate any traces of caustic and is removed from the process through a line 88. Heavier regenerated caustic exits the bottom of the horizontal section 80 through the line 90. The vertical section 78 of the disulfide separator 76 includes carbon Rashig rings to increase the surface area such that liquid entrained in the air is knocked out of entrainment and prevented from exiting through the line 82. A portion of the horizontal section 80 of the disulfide separator 76 includes anthracite coal to serve as a coalescer. Caustic droplets contained in the disulfide phase will be coalesced into larger, heavier droplets that will fall down to the heavier aqueous caustic phase to exit the inlet to the line 90 instead of the inlet to the line 84.

The line 90 carrying regenerated caustic splits into two lines 92 and 50. The line 92 carries regenerated caustic to the extractor section 32 at a rate regulated by a control valve 94 governed by a flow rate controller (FRC) 96. The line 50 carries regenerated caustic to the caustic recirculation conduit 20 at a flow rate regulated by the control valve 52 governed by the FRC 98. The FRC's 96 and 98 measure the flow rate of caustic in their respective lines 92 and 50 and signal the control valves 52 and 94, a setting relative to fully open to obtain a desired input flow rate. The desired input flow rate is determined to obtain a desired caustic concentration in the respective section of the extraction vessel 24.

The pressure in the amine absorber vessel 12 and in the extraction vessel 24 is maintained by regulating the flow of hydrocarbon from the extractor section 32 in the product conduit 60 by a control valve 61 governed by a pressure indicator controller (PIC) 63 that monitors the pressure in the product conduit 60. The pressure should preferably be kept at a level to ensure that the hydrocarbon remains in a liquefied state. This pressure typically ranges between 517 and 2758 kPa (75 and 400 psig). The temperature of the hydrocarbon streams are preferably maintained around a temperature of 38° C. (100° F.). The heater 66 raises the temperature of the spent caustic preferably from 38° C. (100° F.) to about 43° C. (110° F.) before it enters the oxidation vessel 72 in the line 70. The oxidation reaction is exothermic which results in an increase in the temperature of the effluent in the exit conduit 74 preferably not to exceed 57° C. (135° F.). Hence, the temperature in the disulfide separator 76 will preferably be less than 57° C. (135° F.). The pressure in the oxidation vessel 72 and in the disulfide separator 76 is maintained preferably between 345 and 448 kPa (50 and 65 psig) in the line 82 by a control valve 85 regulated by a pressure indicator controller (PIC) 87 monitoring the pressure in the line 82.

Figure 2:
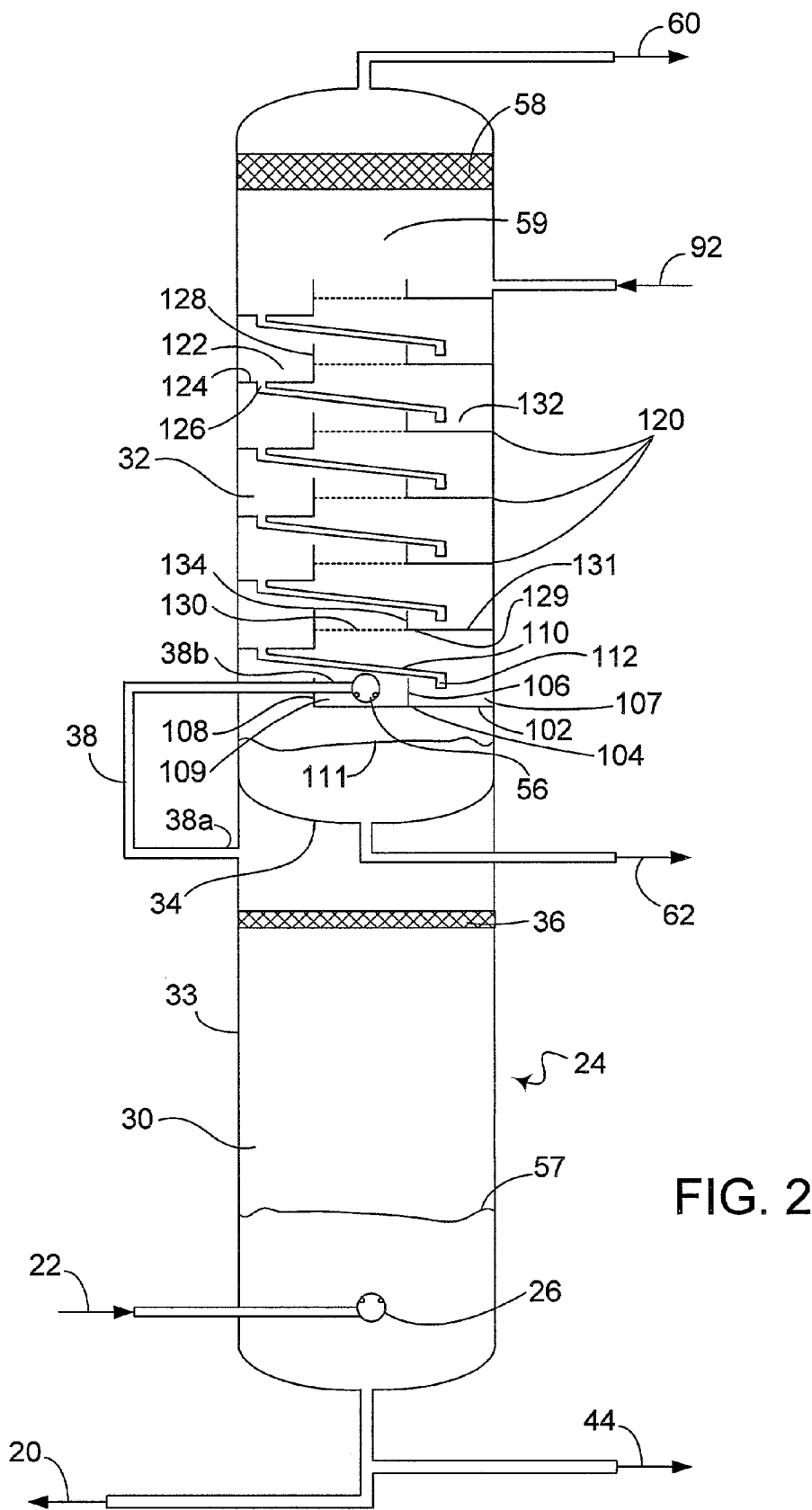
FIG. 2 is a detailed schematic of the extraction vessel of FIG. 1.

FIG. 2 shows the internals of the extraction vessel 24 in greater detail. The prewash section 30 is substantially empty with some exceptions. An outlet of the line 22 extends to a distributor 26 that upwardly dispenses feed therefrom. The distributor 26 comprises a cylindrical pipe perpendicular to the line 22 with openings directed upwardly at 45° above the horizontal. A caustic-hydrocarbon interphase 57 is located typically between the distributor 26 and the coalescer 36. The coalescer 36 comprises a mesh blanket of about 30 cm (1 foot) thick proximate to the top end which extends across the entire cross-sectional area of the prewash section 30. An inlet 38a to the transfer conduit 38 disposed above the coalescer 36 delivers fluid through an outlet 38b to the distributor 56 in the extractor section 32. An inlet to the line 62 extends through the prewash section 30 above the coalescer 36.

Figure 3:
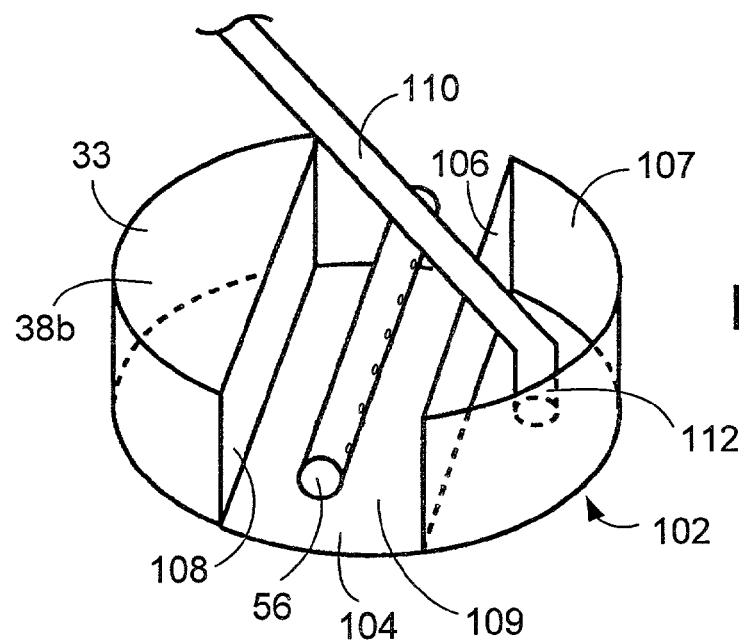
FIG. 3 is a perspective view of a feed deck in an extractor section of the present invention.

The internals of the extractor section 32 are shown in FIG. 3, in conjunction with FIG. 2. The distributor 56 comprises a cylindrical pipe extending perpendicularly to the outlet 38b of the transfer conduit 38 that communicates with the distributor 56. Downwardly disposed openings at 45° below the horizontal admit feed to the extractor section 32. The distributor 56 is disposed over a feed deck 102 comprising a horizontal plate 104 extending partially across the cross-sectional area of the extractor section 32 and two upstanding weirs 106 and 108. The distributor 56 is disposed in a feed pan 109 defined by the weirs 106, 108, the plate 104 and an inner surface of the common wall 33 of the extractor section 32 of the extraction vessel 24. A downcomer 110 has an outlet 112 disposed in an inlet pan 107 defined by the plate 104, the weir 106 and the inner surface of the common wall 33 of the extraction vessel 24.

FIG. 2 shows six jet decks 120 above the feed deck 102. More or less jet decks 120 can be used in the extractor section 32 of the present invention. Suitably, 2 to 15 decks are used in an extractor section and 6 to 8 decks are typical. Additionally, other types of structures for facilitating liquid-liquid contact, such as packed beds or trays are contemplated.

Figure 4:
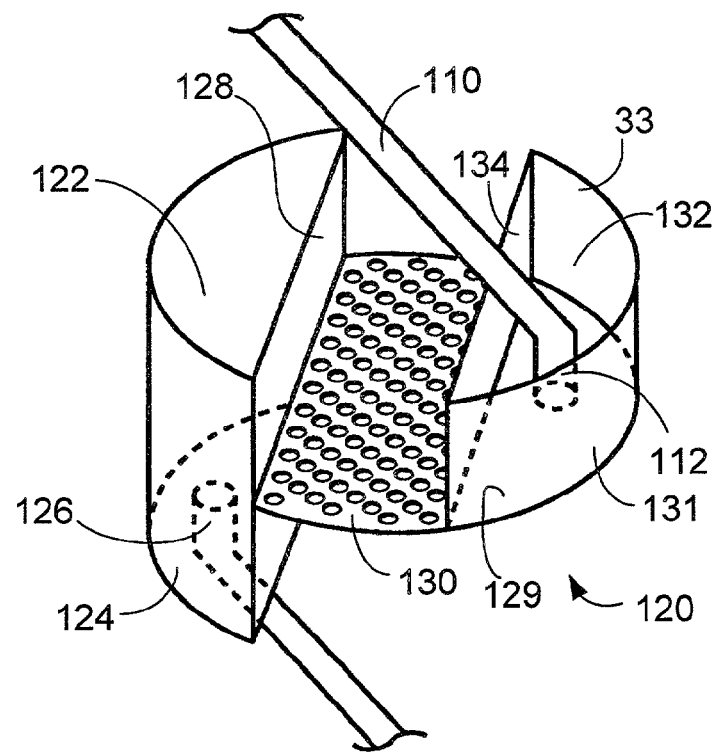
FIG. 4 is a perspective view of a jet deck of an extractor section of the present invention.

FIGS. 2 and 4 will be referenced to describe the jet decks 120. Each jet deck 120 includes an outlet pan 122 defined by an inner surface of the common wall 33 of the extraction vessel 24, a horizontal pan plate 124, which communicates with an inlet 126 of the downcomer 110, and a vertical weir 128. The jet decks 120 also include a plate 129 comprising a perforate sieve section 130 and an imperforate section 131. The imperforate section 131 is separated from the sieve section 130 by a vertical weir 134. An inlet pan 132 is defined by the imperforate section 131, the inner surface of the common wall 33 and the weir 134. Regenerated caustic from the line 92 is fed to the inlet pan of the topmost jet deck 120.

It can be seen in FIG. 3 that the vertical weirs 106, 108 extend chordally across the extractor section 32 to define the inlet pan 107 and the feed pan 109. It can be seen in FIG. 4 that the vertical weirs 128, 134 extend chordally across the extractor section 32 to define the inlet pan 132 and the outlet pan 122. The height of the weirs 106, 108, 128 and 134 are about 30.5 cm (1 foot) so when caustic exceeds 30.5 cm (1 foot) in depth, it spills over the respective weir. The height of the weirs may be made taller. In the feed deck 102, caustic spilling out of the inlet pan 107 and feed pan 109 spills down to a caustic-hydrocarbon interphase 111 below the feed deck 102. In the case of the jet decks 120, spilling caustic flows onto the sieve section 130 to contact hydrocarbon ascending through perforations in the sieve section 130. Caustic that makes it way into the outlet pan 122 of the jet decks 120 proceeds through the inlet 126 of the downcomer 110 down into the inlet pans 132, 107 of the subjacent jet deck 120 or feed deck 102, respectively, through the outlet 112. This arrangement assures adequate contact between the hydrocarbon and the caustic while the hydrocarbon rises to the top of the extractor section 32 and out through the product conduit 60.

Proximate a top of the extractor section 32 above the jet decks 120 is the coalescer 58. The coalescer 58 comprising a mesh blanket extends across the entire cross-sectional area of the extractor section 32. It is important that the coalescer 58 be of sufficient quality so as to permit no more than 2 ppm caustic and preferably no more than 1 ppm caustic to pass through it because it is the last barrier preventing caustic from leaving with the hydrocarbon product. A coalescer such as the COALEX from Koch-Otto-York is suitable.

The coalescer 58 is spaced apart from the top jet deck 120 to provide an open settling volume 59 therebetween to act as a buffer in the event of a caustic surge. The settling volume 59 occupies at least as much volume to accommodate one more jet deck 120. The coalescer 58 and the settling volume 59 in the extraction vessel 24 obviate the need for the sand filter and the settling drum vessels in the conventional liquid-liquid extraction process.

What is claimed is:

1. An apparatus for converting sulfur compounds in a hydrocarbon stream, said apparatus comprising:
    a prewash section for converting hydrogen sulfide to sodium sulfide;
    a hydrocarbon feed conduit with an inlet in communication with said prewash section;
    an extractor section for converting mercaptans to mercaptides, said extractor section being disposed directly above said prewash section and one vessel includes said extractor section and said prewash section;
    a hydrocarbon product conduit with an outlet in communication with said extractor section; and
    a conduit having an outlet in communication with the prewash section and an inlet in communication with the extractor section.

2. The apparatus of claim 1 wherein said extractor section includes a coalescer at a top thereof.

3. The apparatus of claim 1 wherein said extractor section and said prewash section are separated by an imperforate baffle.

4. The apparatus of claim 1 wherein the inlet to the feed conduit to said prewash section is disposed proximate to a bottom of said prewash section.

5. The apparatus of claim 4 wherein said feed conduit includes an inlet for water upstream of said inlet to said prewash section and an inlet for caustic upstream of said inlet for water.

6. The apparatus of claim 2 wherein the inlet to said product conduit is above said coalescer.

7. The apparatus of claim 2 wherein said apparatus includes a regenerated alkaline conduit with an outlet in communication with said extractor section below said coalescer.

8. The apparatus of claim 1 wherein said extractor section includes a coalescer at a top thereof and said extractor section and said prewash section are separated by an imperforate baffle.

9. The apparatus of claim 8 wherein a spent alkaline conduit has an inlet in communication with a bottom of said extractor section.

10. A process for converting sulfur compounds in a hydrocarbon stream comprising:
feeding a hydrocarbon stream containing sulfur compounds to a prewash section containing alkali to convert hydrogen sulfide to sodium sulfide;
withdrawing a prewashed hydrocarbon stream from said prewash section;
feeding said prewashed hydrocarbon stream to an extractor section to convert mercaptans to mercaptides, said extractor section being directly above said prewash section; and
withdrawing an extracted hydrocarbon stream containing mercaptides from said extractor section.

11. The process of claim 10 wherein said hydrocarbon stream is fed at proximate a bottom of said prewash section and said prewashed hydrocarbon stream is withdrawn from proximate a top of said prewash section.

12. The process of claim 10 wherein alkali containing mercaptides is withdrawn from said extractor section.

13. The process of claim 10 wherein said hydrocarbon stream must travel through a coalescer before being withdrawn from said extractor section.

14. The process of claim 10 wherein regenerated alkali is fed to said extractor section below said coalescer.

15. The process of claim 10 wherein the alkali in said extractor section has a greater concentration than the alkali in said prewash section.

16. The process of claim 10 wherein an alkaline stream containing mercaptides is withdrawn from said prewash section.

17. An apparatus for converting sulfur compounds in a hydrocarbon stream, said apparatus comprising:
an extractor section for converting mercaptans to mercaptides;
a hydrocarbon feed conduit with an outlet in communication wit said extractor section proximate a bottom of said extractor section;
a hydrocarbon product conduit with an inlet in communication with said extractor section proximate a top of said extractor section;
a structure for facilitating contact between alkali and hydrocarbon disposed between the outlet of said hydrocarbon feed conduit and the inlet of said hydrocarbon product inlet;
an alkaline conduit wit an inlet disposed below the outlet to said hydrocarbon feed conduit; and
a mesh coalescer in said extractor section disposed between the inlet to said hydrocarbon product conduit and a top of said structure for facilitating contact between alkali and hydrocarbon, said coalescer structured to permit no more than 1 ppm of alkali from passing therethrough during operation.

18. The apparatus of claim 17 wherein an open settling volume is disposed between a top of said structure for facilitating contact between alkali and hydrocarbon and said coalescer.

19. The apparatus of claim 18 wherein said structure for facilitating contact between alkali and hydrocarbon comprises a plurality of decks and said open settling volume could accommodate one of said decks.

* * * * *

UNITED STATES PATENT AND TRADEMARK OFFICE
CERTIFICATE OF CORRECTION

PATENT NO.      : 7,326,333 B2  
APPLICATION NO. : 10/027153  
DATED           : February 5, 2008  
INVENTOR(S)     : Luigi Laricchia et al.

Page 1 of 1

It is certified that error appears in the above-identified patent and that said Letters Patent is hereby corrected as shown below:

Column 10, line 6, replace "wit" with --with--.

Signed and Sealed this

Twenty-ninth Day of July, 2008

JON W. DUDAS  
*Director of the United States Patent and Trademark Office*